July 29, 1969     J. A. McAVOY     3,458,717
READ-IN DRIVER
Filed Dec. 10, 1965     2 Sheets-Sheet 1
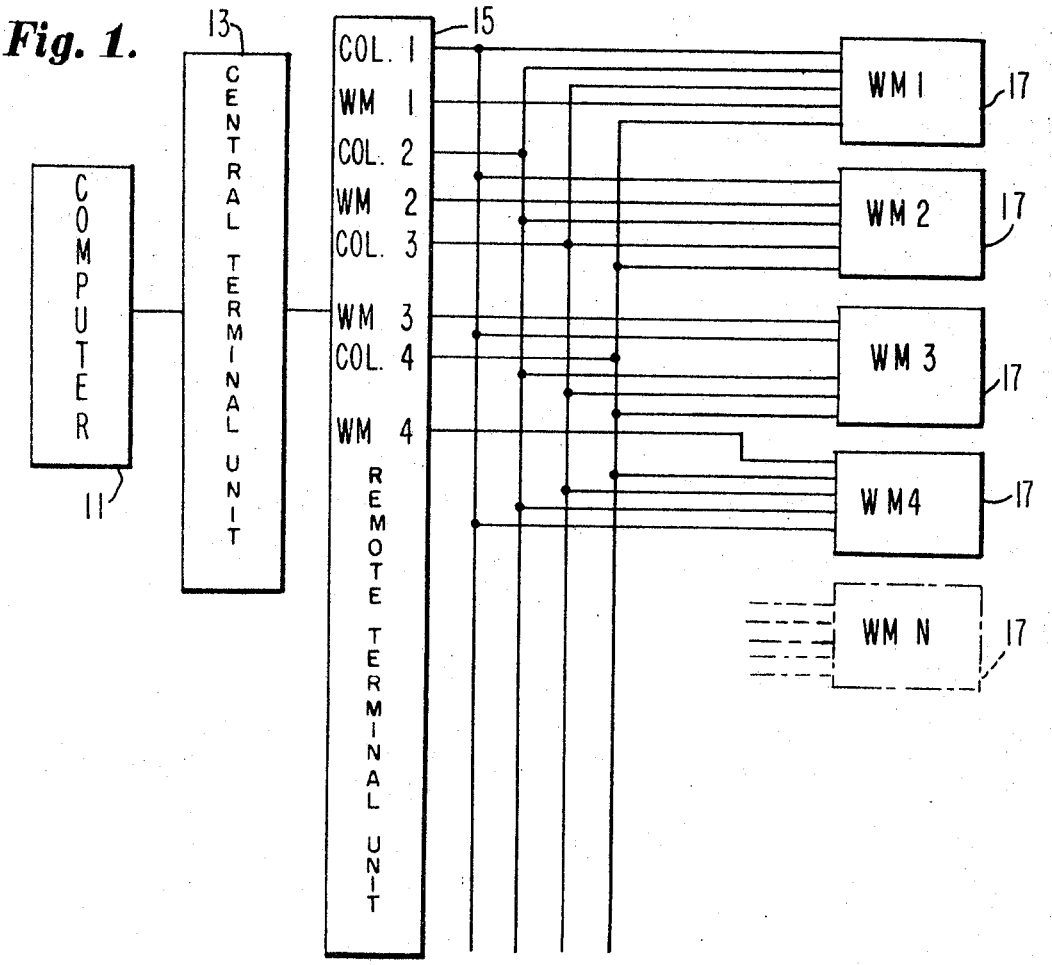
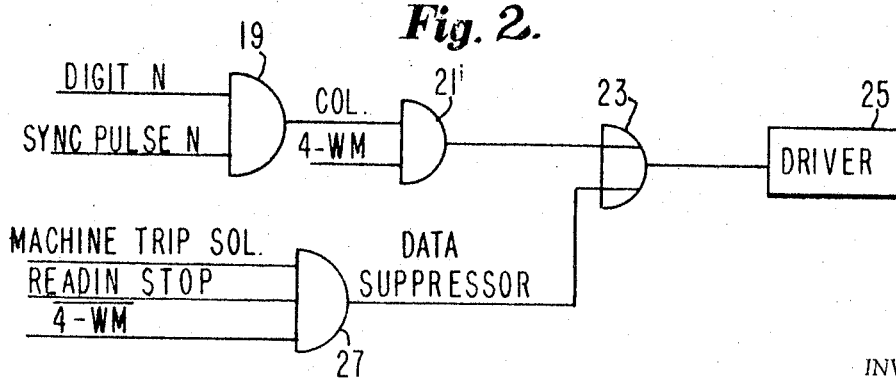
INVENTOR.
JOHN A. McAVOY.

July 29, 1969 J. A. McAVOY 3,458,717
READ-IN DRIVER

Filed Dec. 10, 1965 2 Sheets-Sheet 2

United States Patent Office 3,458,717
Patented July 29, 1969

3,458,717
READ-IN DRIVER
John A. McAvoy, Detroit, Mich., assignor to Burroughs Corporation, Detroit, Mich., a corporation of Michigan
Filed Dec. 10, 1965, Ser. No. 513,131
Int. Cl. H02j 1/04
U.S. Cl. 307—154                                  3 Claims

ABSTRACT OF THE DISCLOSURE

The matrix control of individual solenoid drivers in a multi-station system in order to select a particular machine and a particular solenoid driver in the selected machine comprising a transistor OR logic gate for the low voltage control of a large voltage solenoid, a first transistor AND logic gate applied to the OR gate for suppressing all solenoid drivers and machines not being used, and a second transistor AND logic gate applied to the OR gate for the selection of the particular solenoid driver of the machine used.

---

This invention relates to read-in drivers, and more specifically to a matrix control of drivers for individually and rapidly controlling the energization or de-energization of solenoids associated with differentially positionable racks in business machines.

In modern business machines utilized in a computer controlled multi-station system, it is necessary that the various differentially positionable racks of each machine of the multi-station system be positively and rapidly controlled. For example, in a machine of the type described in Patent No. 2,822,752, assigned to the same assignee as the present invention, all racks move together on each machine cycle. Individual solenoid-controlled stop means are utilized to arrest the movement of the individual racks in accordance with information which is stored in an accumulator or other storage device. It will be appreciated that in a computer-controlled machine the speed of arrestment of the individual differentially positionable racks is of prime importance. In order to obtain the proper speed of operation, it is necessary to apply a relatively large voltage across the solenoid terminals. Heretofore, the de-energization or energization of the solenoid, as the case may be, was accomplished by the use of circuits employing silicon controlled rectifiers or transistors having high voltage break-down characteristics. Both of these types of circuits are relatively expensive.

It will also be appreciated that there are times when it is desirable to space the carriage of the machine, i.e., move from column to column, without the registry of information on a form being processed by the machine. When the spacing function occurs, the time necessary for this function becomes especially critical when the machine is employed in a multi-station system under computer control. Without a data suppress capability many machines start to cycle, when a column shift is initiated. With a computer data source, even though there was no information to be transferred, the computer would be occupied during a simple spacing function. It will be obvious that tying up the computer for even a half a second is extremely wasteful, when consideration is given to the fact that modern-day computers may make several million computations in that period of time.

When utilizing the machines in a multi-station computer controlled system, information is transmitted from an individual teller's window machine to the computer, where additional information is obtained, such as the balance in a customer's account, and is sent back to the individual window machine. It will be appreciated that the computer must have the capability of selecting, by means of a code, an individual figure in an individual column of an individual teller's machine. A problem similar to this has arisen in the addressing of a given core in a multi-plane magnetic core memory matrix.

It is therefore an object of this invention to provide a read-in driver control matrix which is capable of very rapid reversal of current through solenoids controlling differentially positionable racks in business machines in response to computer commands.

It is a further object of this invention to improve control of existing solenoid drivers.

In carrying out the above objects, applicant's inventive concept utilizes a matrix type switching circuit for controlling individual solenoids to arrest the motion of differentially positionable racks in a business machine, the switching circuit being energizable by the coincidence of a pair of information signals applied to a pair of switching means in series, or alternatively being energizable by the application of an individual data suppress signal to a single switching means.

Further objects and advantages will become apparent or will be specifically pointed out in the following specification, when taken with the accompanying drawings, in which:

FIG. 1 is a schematic representation of a matrix-type control system for selective activation of business machines.

FIG. 2 represents in a logic form applicant's invention for selectively energizing a single solenoid driver.

Figure 3:
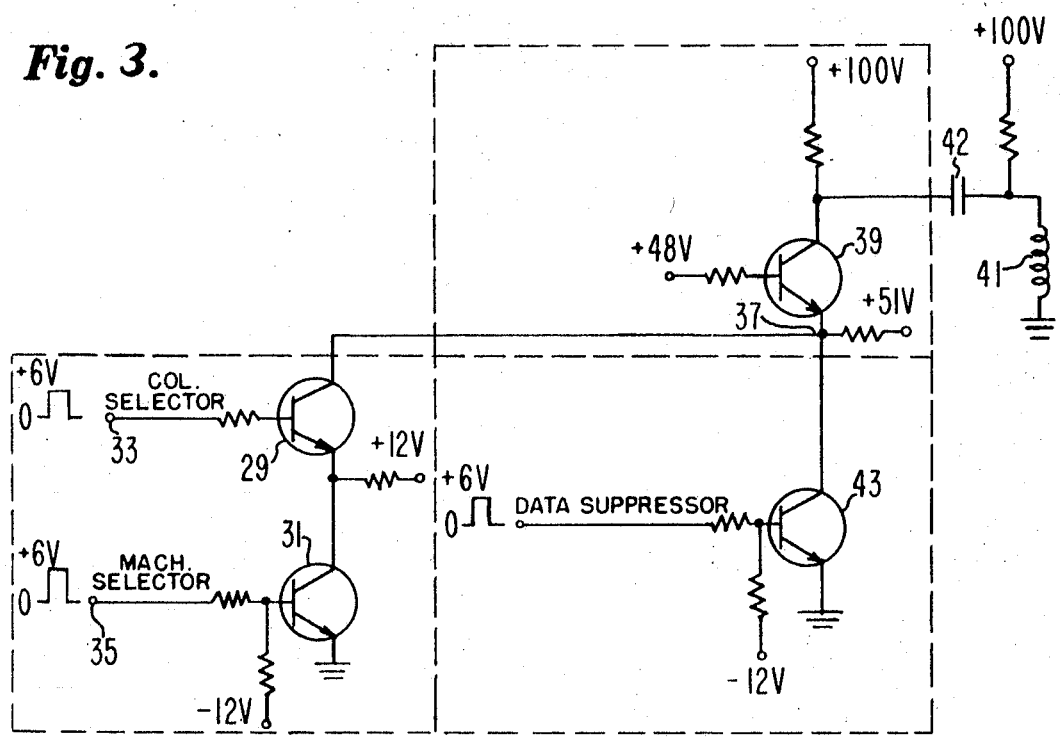
FIG. 3 is a schematic diagram of one embodiment of applicant's invention.

For ease in understanding, applicant's invention will be hereinafter described as being embodied in a banking system having a computer which controls, through appropriate terminal units, the transfer of information to or from individual teller's window machines, such as those employed in a bank. A system of this type is generally utilized to post customer-depositor accounts in a central storage system and update the customer's account book. For example, in a system in which one computer is utilized to control a number of banks in a city, the teller will insert the account book into a business machine and punch keys representing the account number and other information relating to the transaction. This information is scanned through the appropriate terminal units by the computer, and is both received, processed and the results transmitted by the computer. Each entry from the teller's machine to the computer is initiated by the tripping of the motor bar of the machine. Information is transferred only when that particular machine is being scanned by the computer.

As shown in FIG. 1, a computer 11 is connected to a central terminal unit (CTU) 13, which in turn controls a plurality of remote terminal units (RTU) 15. Remote terminal units 15 are capable of controlling a plurality of individual window machines 17. Connections are provided between the column positions of the RTU 15 and the column connections of each window machine 17. In other words, a digit appearing at the column terminal of RTU 15 will be transmitted to the colunm connections of all window machines 17 serviced by that unit. However, in accordance with applicant's invention, this transmission does not of itself cause the window machines to operate. A second input from the RTU which is addressed to a specific window machine is necessary for that machine to operate.

This addressing function is shown logically in FIG. 2, wherein an input representing a specific digit is applied to an AND gate 19, which has a second input in the form of a sync pulse which will represent a timing function of the same digit. Upon coincidence of these signals AND gate 19 has an output which is applied to an individual column of all window machines controlled by the RTU involved. This input is logically applied as a first input to AND gate 21. The second input to AND gate 21 is a specific window machine address. Upon coincidence of these signals, an output is applied through OR gate 23 to solenoid driver 25, which arrests the movement of a differentially positionable rack (not shown) in the business machine.

Applicant's invention also provides circuitry for arresting the movement of differentially positionable racks when a column spacing or other non-information transmitting function occurs. This latter capability is advantageous in that the computer is not required to sit idle while an individual window machine carriage moves from one column to another. This desirable feature is accomplished by the utilization of an AND gate 27, which has a first input indicating that the machine has been tripped, a second input indicating that the machine is in a position for read-in, and a third input that the machine is not addressed. Upon coincidence of these signals, a data suppress signal is applied through OR gate 23 to solenoid driver 25 to again arrest the movement of the individual differentially positionable rack. This feature is necessary when utilizing machines that would normally print on each signal unless means were provided to inhibit or arrest this printing.

As shown in FIG. 3, serially connected transistors 29 and 31, having inputs 33 and 35 connected respectively thereto, function as the AND gate 21 of FIG. 2. Input 33 is utilized to apply the column select signal to transistor 29. In order to have conduction of the circuit, a signal representing the selection of a given window machine must also be applied at input 35. Upon coincident application of both of these signals, transistors 29 and 31 conduct, thereby applying sufficient potential to terminal 37 to cause conduction of transistor 39. The circuitry attached to transistor 39, including a solenoid coil 41, provides a rapid reversal of current in said coil 41, which allows the rapid dropout of the clapper associated with the coil 41. When transistor 39 is non-conductive, coil 41 is energized. Upon conduction of transistor 39, capacitor 42 discharges, aiding the collapse of the field in coil 41.

Terminal 37, for simplicity, may be considered analogous to OR gate 23 of FIG. 2. Also attached to terminal 37 is the output from the collector of transistor 43. The input to transistor 43 may be considered analogous to the output from AND gate 27. The parameters necessary to cause conduction of transistor 43 are the same as those shown in FIG. 2 to qualify AND gate 27. The conduction of transistor 43 places the proper potential at terminal 37 to cause conduction of transistor 39, with the resultant dropout of the coil 41.

Figure 4:
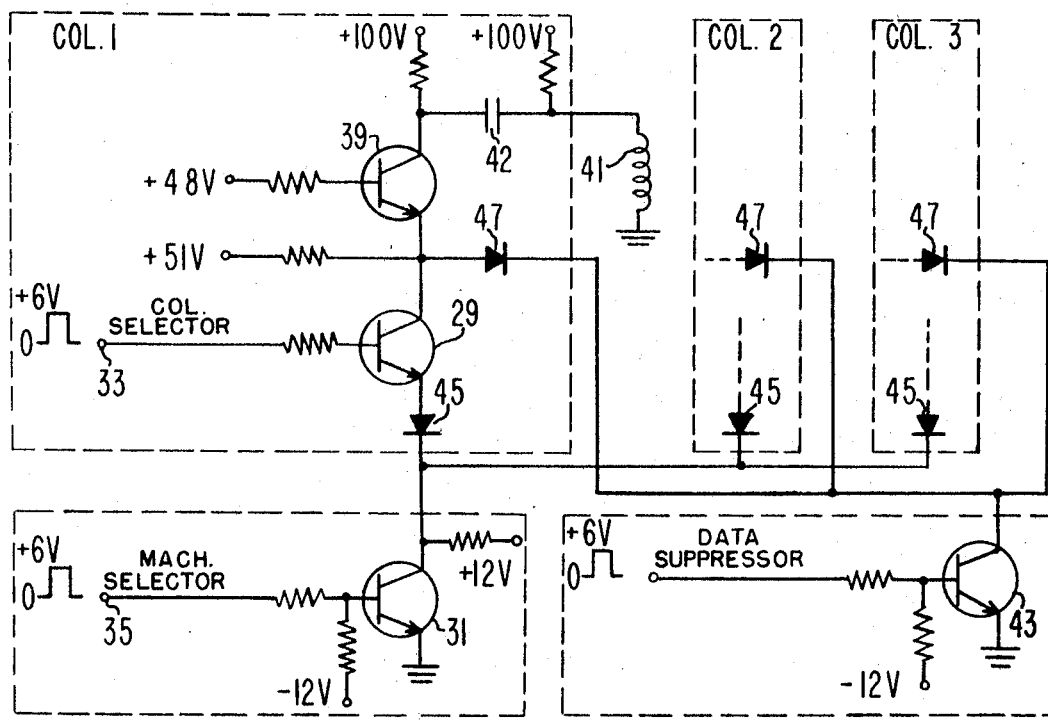
FIG. 4 is a schematic diagram of a preferred embodiment of the invention.

The circuitry of FIG. 3 represents that which is necessary to operate the solenoid for one column of one machine. When a plurality of these circuits are combined into a matrix type system as shown in FIG. 1, it is necessary to make modifications to prevent undue current drain by the application of signals to non-addressed machines. The circuitry in FIG. 4 is similar to that shown in FIG. 3, with the addition of biasing diodes 45 and 47. In other words, the utilization of these diodes prevents the application of any load on the line when a machine is not addressed. It will be appreciated that when a number of machines are utilized in one system, the necessity for means of preventing undue load becomes critical, depending upon available power sources.

Although applicant's invention has been explained for clarity in a computer controlled multi-station banking system, it will be obvious to those skilled in the art that it would find application in many other devices in which a differentially positionable rack must be selectively stopped. It will also be apparent to those skilled in the art that other variations in specific structure illustrated and the component materials mentioned may be made without departing from the spirit and scope of the invention.

I claim:

1. In a multiple machine system, each machine having a plurality of data columns represented by a differentially positionable rack, the position of said racks being controlled by individual solenoids, a matrix type switching circuit for controlling solenoid drivers for each of said solenoids comprising gating means for each of said solenoid drivers, means for applying a first signal simultaneously to said gating means for said solenoid drivers for a like column of each said machines, means for applying a second signal to said gating means of all of said solenoid drivers of an individual machine, said second signal being applied coincidentally with said first signal to activate an individual column solenoid driver, and means for alternatively energizing individual column solenoid drivers upon the application of a single data suppress signal, whereby said racks may be restrained from movement.

2. A system for selectively controlling differentially positionable racks associated with individual columns in several business machines each having discrete read-in positions comprising solenoid means in each of said business machines for arresting motion of said differentially positionable racks, a matrix switching circuit for controlling said solenoid means, an OR circuit having individual inputs for applying a signal to said matrix switching circuit, a first AND gate having its output applied to one input to said OR gate and being controlled by the coincidence of a pair of signals representing the associated column and a particular one of said machines, and a second AND gate having its output applied to a second input to said OR gate, said second AND gate having an output upon the coincidence of three inputs, the first corresponding to a signal indicative that a machine is activated, the second corresponding to a signal indicative that the associated machine is at a read-in position, and a third signal indicating that the associated machine is not selected.

3. In a multiple business machine system wherein each business machine is independently operable and each is capable of printing in a plurality of like data columns, a print control inductive device associated with each such data column of each business machine in the system for controlling the printing of characters in its column and operable in response to a change in energization thereof to cause the printing of a designated character therein, an AND gate circuit operatively associated with each print control device of each business machine and having two inputs, means for applying a character designating signal signifying a particular character to be printed to one of the two inputs of those AND gate circuits associated with a selected set of like columns of the business machines in the system, means for applying a machine addressing signal, signifying a particular one of said machines for printing the character, to the other inputs of the AND gates associated with the addressed machine in time coincidence with the character designating signal thereby distinguishing the addressed machine from the remaining machines of the system, the AND gate receiving said time coincident signals providing an output which changes the energization of its associated print control device thereby causing the addressed machine to print the designated character in the selected column of the addressed machine with which AND gate is associated, an OR gate in each said AND gate circuit between the AND gate thereof and the inductive device controlled thereby, and a print suppressing circuit associated with each business machine of the system and connected to the said OR gates thereof and responsive to a signal condition signifying a non-information transmission occurrence for causing the print control devices of the selected set of data columns of all unaddressed machines in the system to suppress their respective printing operations while the addressed machine is printing the designated character in its selected data column.

References Cited

UNITED STATES PATENTS 3,093,303  6/1963  Dirks.
3,125,271  3/1964  Marshall.
3,151,545  10/1964  Griggs _____ 101—93

LEE T. HIX, Primary Examiner

U.S. Cl. X.R.

317—148.5; 307—218